United States Patent
Khalid et al.

(10) Patent No.: US 10,453,263 B2
(45) Date of Patent: Oct. 22, 2019

(54) METHODS AND SYSTEMS FOR DISPLAYING AUGMENTED REALITY CONTENT ASSOCIATED WITH A MEDIA CONTENT INSTANCE

(71) Applicant: Verizon Patent and Licensing Inc., Arlington, VA (US)

(72) Inventors: Mohammad Raheel Khalid, Budd Lake, NJ (US); Samir S. Vaidya, Highland Park, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/907,120

(22) Filed: Feb. 27, 2018

(65) Prior Publication Data
US 2019/0266800 A1 Aug. 29, 2019

(51) Int. Cl.
| | |
|---|---|
| *H04N 5/225* | (2006.01) |
| *H04N 21/44* | (2011.01) |
| *H04N 5/222* | (2006.01) |
| *H04N 21/41* | (2011.01) |
| *G06T 19/00* | (2011.01) |
| *G06K 9/00* | (2006.01) |

(Continued)

(52) U.S. Cl.
CPC ........ *G06T 19/006* (2013.01); *G06K 9/00718* (2013.01); *G06T 7/70* (2017.01); *H04N 1/00347* (2013.01); *H04N 21/4126* (2013.01); *H04N 21/44016* (2013.01); *G06T 2207/10016* (2013.01); *H04N 5/23216* (2013.01)

(58) Field of Classification Search
CPC .. G02B 27/017; G02B 27/01; H04N 21/4223; H04N 21/4312; H04N 21/44016; H04N 21/4788; H04N 21/6125; H04N 21/816; H04N 21/8358; H04N 1/00347; H04N 21/4122; H04N 21/4126; H04N 21/4722; H04N 2201/0084; H04N 2201/0089; H04N 21/41407; H04N 21/42209; H04N 21/4316; H04N 21/435; H04N 21/4828
See application file for complete search history.

(56) References Cited

U.S. PATENT DOCUMENTS

| | | | |
|---|---|---|---|
| 6,037,936 A | 3/2000 | Ellenby et al. | |
| 6,067,112 A | 5/2000 | Wellner et al. | |

(Continued)

OTHER PUBLICATIONS http://www.pranavmistry.com/projects/sixthsense/, as accessed on Feb. 26, 2018.

*Primary Examiner* — Jin Cheng Wang

(57) ABSTRACT

An exemplary system directs a camera included within a mobile device to capture a video feed, directs the mobile device to display the video feed within a display screen of the mobile device, and identifies a plurality of adjacent pixel blocks within the display screen that have signal characteristics that uniformly vary by more than a threshold amount over a predetermined time period. Based on the uniformly varying signal characteristics, the system determines that a pixel region constituted by the pixel blocks corresponds to a position of a display device within a field of view of the camera. The system identifies a media content instance being displayed by the display device, identifies augmented reality content associated with the media content instance, and directs the mobile device to display the augmented reality content within the pixel region of the display screen.

20 Claims, 11 Drawing Sheets

(51) Int. Cl.
*G06T 7/70* (2017.01)
*H04N 1/00* (2006.01)
*H04N 5/232* (2006.01)

(56) References Cited

U.S. PATENT DOCUMENTS

| | | |
|---|---|---|
| 7,248,285 B2 | 7/2007 | Needham |
| 7,680,324 B2 | 3/2010 | Boncyk et al. |
| 8,026,931 B2 | 9/2011 | Sun et al. |
| 8,098,881 B2 | 1/2012 | Camp et al. |
| 8,312,017 B2 | 11/2012 | Martin et al. |
| 8,483,754 B2 | 7/2013 | Rao et al. |
| 8,913,171 B2 | 12/2014 | Roberts et al. |
| 2002/0102966 A1 | 8/2002 | Lev et al. |
| 2002/0167484 A1 | 11/2002 | Hatanaka et al. |
| 2004/0113885 A1 | 6/2004 | Genc et al. |
| 2004/0179107 A1 | 9/2004 | Benton |
| 2004/0208372 A1 | 10/2004 | Boncyk et al. |
| 2005/0185060 A1 | 8/2005 | Neven, Sr. |
| 2006/0002607 A1 | 1/2006 | Boncyk et al. |
| 2006/0240862 A1 | 10/2006 | Neven et al. |
| 2006/0262188 A1 | 11/2006 | Elyada et al. |
| 2008/0144860 A1* | 6/2008 | Haller .................... H03G 3/10 381/109 |
| 2008/0279481 A1 | 11/2008 | Ando |
| 2009/0182644 A1* | 7/2009 | Panagopulos .......... G06Q 30/02 705/26.1 |
| 2009/0232354 A1 | 9/2009 | Camp, Jr. et al. |
| 2009/0285484 A1 | 11/2009 | Mallinson et al. |
| 2010/0199232 A1 | 8/2010 | Mistry et al. |
| 2011/0313856 A1 | 12/2011 | Cohen et al. |
| 2012/0017236 A1* | 1/2012 | Stafford .................. A63F 13/00 725/32 |
| 2012/0098934 A1* | 4/2012 | McKiel, Jr. ........ H04N 13/0007 348/46 |
| 2012/0120296 A1* | 5/2012 | Roberts .............. H04N 21/4126 348/333.12 |
| 2012/0265735 A1* | 10/2012 | McMillan .......... H04N 21/8352 707/687 |
| 2014/0317659 A1* | 10/2014 | Yasutake .......... H04N 21/42209 725/43 |
| 2015/0170245 A1* | 6/2015 | Scoglio .............. G06Q 30/0623 705/14.55 |
| 2016/0037232 A1* | 2/2016 | Hu ...................... H04N 21/812 725/34 |
| 2016/0323552 A1* | 11/2016 | Peterson .............. H04N 9/3182 |
| 2017/0163900 A1* | 6/2017 | Gaetje ...................... G02C 7/12 |
| 2017/0201808 A1* | 7/2017 | Chowdhary ......... H04N 21/816 |
| 2018/0192149 A1* | 7/2018 | Anguiano .......... H04N 21/4821 |
| 2018/0204060 A1* | 7/2018 | Merchant ......... G06K 19/06037 |

* cited by examiner

METHODS AND SYSTEMS FOR DISPLAYING AUGMENTED REALITY CONTENT ASSOCIATED WITH A MEDIA CONTENT INSTANCE

BACKGROUND INFORMATION

Media content providers and creators are always seeking ways to better engage and attract viewers of media content. For example, various mobile applications have been developed that allow a user to watch a media content instance (e.g., a television program or a broadcast of a live event) on a television or other suitable display device, and, at the same time, access additional content associated with the media content instance by way of a mobile device (e.g., a mobile phone or tablet computer). However, current interactive applications leave room for improvement. For example, it would be desirable for a user to be able to more effectively and enjoyably use his or her mobile device to interact with a media content instance (e.g., a live event) being displayed by a display device (e.g., a television). To illustrate, it would be desirable for a user to be able to aim a sensor (e.g., a camera) of the mobile device at a display device and view augmented reality content associated with the live event within a display screen of the mobile device. However, numerous technical challenges have heretofore prevented this type of user interaction with a media content instance that is being displayed by the display device.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
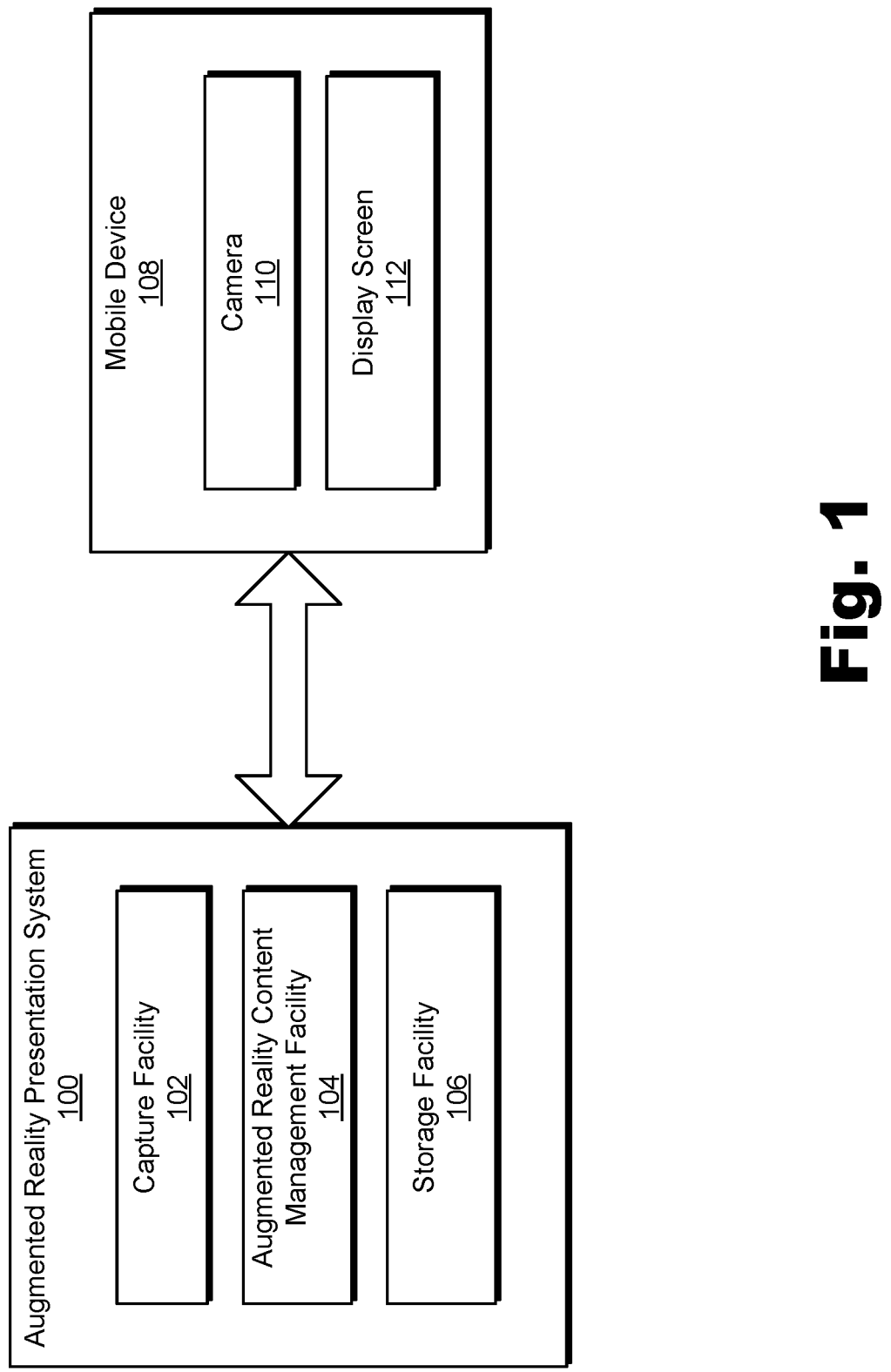
FIG. 1 illustrates an exemplary augmented reality presentation system according to principles described herein.

Methods and systems for displaying augmented reality content associated with a media content instance that is being displayed by a display device (e.g., a television or a computer monitor) are described herein.

For example, in certain implementations, an augmented reality presentation system may direct a camera included within a mobile device to capture a video feed of a portion of a real-world environment. Specifically, the portion of the real-world environment captured by the camera may be a portion included within a field of view of the camera. In the examples described herein, a display device (e.g., a television, a computer screen, etc.) may be physically located within the real-world environment, and, depending on the aim of the camera, may be positioned within the field of view of the camera.

As the camera captures the video feed, the augmented reality presentation system may direct the mobile device to display the video feed within a display screen of the mobile device. While the mobile device displays the video feed within the display screen, the augmented reality presentation system may identify a plurality of adjacent pixel blocks within the display screen that have signal characteristics that uniformly vary by more than a threshold amount over a predetermined time period. These adjacent pixel blocks together constitute a pixel region within the display screen. As will be described in more detail below, based on the uniformly varying signal characteristics, the augmented reality presentation system may determine that the pixel region corresponds to a position of the display device within the field of view of the camera.

In some examples, the augmented reality presentation system may identify a media content instance being displayed by the display device while the display device is included within the field of view of the camera. The augmented reality presentation system may then identify augmented reality content associated with the media content instance and direct the mobile device to display the augmented reality content within the pixel region of the display screen while the mobile device displays, within the display screen, the video feed being captured by the camera. In this manner, as the user looks at the display screen of the mobile device, the augmented reality content displayed within the display screen may appear to "take over", replace, or otherwise augment the media content instance being displayed by the display device.

Numerous benefits may be realized by the methods and systems described herein. For example, the methods and systems described herein may allow a user to access (e.g., view) augmented reality content associated with a media content instance being displayed by a display device even in situations where the media content instance is a live event (e.g., a sporting event or a performance being broadcast, streamed, or otherwise provided for display in substantially real-time). As mentioned, numerous technical challenges have heretofore prevented this type of user interaction with a live event that is being displayed by a display device. For example, it has heretofore been technically challenging to determine a location of a display device within a display screen of a mobile device while the display device is displaying a live event. This is because it may be computationally infeasible, due to the real-time nature of the live event, to process and insert visual markers that can be recognized by the mobile device into a transport stream that carries data representative of the live event. Without these visual markers, the mobile device may not be able to determine the location of the display device within the display screen of the mobile device. However, the methods and systems described herein may not rely on detecting such markers and instead may ascertain the position of the location of the display device within the display screen of the mobile device based on signal characteristics (e.g., peak signal-to-noise ratios) of pixel blocks included within the display screen. Other benefits and technical computing improvements that may be provided by the methods and systems described herein will be made apparent by the following detailed description.

FIG. 1 illustrates an exemplary augmented reality presentation system 100 ("system 100"). As shown, system may include a capture facility 102, an augmented reality content management facility 104 ("management facility 104"), and a storage facility 106 selectively and communicatively coupled to one another. FIG. 1 further shows a mobile device 108 associated with system 100 and that includes, without limitation, a camera 110 and a display screen 112.

It will be recognized that although facilities 102 through 106 are shown to be separate facilities in FIG. 1, facilities 102 through 106 may be combined into fewer facilities, such as into a single facility, or divided into more facilities as may serve a particular implementation. Each of facilities 102 through 106 may be distributed between multiple devices and/or multiple locations as may serve a particular implementation. Additionally, one or more of facilities 102 through 106 may be omitted from system 100 in certain implementations, while additional facilities may be included within system 100 in the same or other implementations.

Additionally, it will be understood that although system 100 and mobile device 108 are depicted as separate entities associated with one another by way of an arrow, the association between system 100 and mobile device 108 may represent any relationship including a complete integration with one another. For instance, in some examples, system 100 may be separate from and communicatively coupled with mobile device 108 (i.e., such that the arrow represents any suitable communication interface between system 100 and mobile device 108 such as a network-based communication interface). In other examples, system 100 may be integrated with (e.g., included within) mobile device 108 and/or may include or integrate mobile device 108 (i.e., such that the arrow represents an integration of system 100 and mobile device 108 into a single unit). In the same or other examples, facilities 102 through 106 of system 100 may be distributed across multiple systems and/or devices such as by being partially implemented in one or more computing devices implementing system 100 and partially implemented within camera 110, display screen 112, and/or other components of mobile device 108. Each of the components of system 100 and mobile device 108 will now be described in more detail.

Capture facility 102 may include any hardware and/or software that may be configured to perform video feed capture operations. For example, capture facility 102 may direct camera 110 within mobile device 108 to capture a video feed of a portion of a real-world environment (e.g., a portion of the real-world environment that is included within a field of view of camera 110). If mobile device 108 is separate from system 100, capture facility 102 may perform the directing of camera 110 to capture the image by transmitting instructions to this effect over a communication interface (e.g., over a network or the like) to mobile device 108 to be performed by camera 110. If, however, mobile device 108 is integrated with system 100, capture facility 102 may be integrated as, for example, a hardware or software controller configured to control an operation of camera 110. In this type of implementation, capture facility 102 may thus direct camera 110 to capture a video feed by direct control of camera 110.

Capture facility 102 may be further configured to direct mobile device 108 to display the video feed within display screen 112 of mobile device 108 while camera 110 captures the video feed. This may be performed in any suitable manner.

Management facility 104 may include one or more physical computing devices (e.g., the same hardware and/or software components included within capture facility 102 and/or components separate from those of capture facility 102) that perform various operations associated with displaying augmented reality content within display screen 112. For example, management facility 104 may identify, while mobile device 108 displays the captured video feed within display screen 112, a plurality of adjacent pixel blocks within display screen 112 that have signal characteristics that uniformly vary by more than a threshold amount over a predetermined time period. The plurality of adjacent pixel blocks together constitute a pixel region within display screen 112. Based on the uniformly varying signal characteristics, management facility 104 may determine that the pixel region corresponds to a position of a display device (i.e., a position of a display screen of the display device physically located within the real-world environment) within the field of view of camera 110. Management facility 104 may identify a media content instance being displayed by the display device while the display device is included within the field of view of camera 110, identify augmented reality content associated with the media content instance, and direct mobile device 108 to display the augmented reality content within the identified pixel region of display screen 112 while mobile device 108 displays, within display screen 112, the video feed being captured by camera 110. Each of these operations will be described in more detail below.

As used herein, "augmented reality content" may refer to any content that is related to a particular media content instance being displayed by a display device that is separate from mobile device 108. For example, augmented reality content may include a video (e.g., a trailer, a video clip, etc.), a filtered view of the media content instance (e.g., a pencil drawing version of the media content instance), an advertisement, a still image, and/or any other type of media content that may be displayed within display screen 112 while a related media content instance is being displayed by a display device that is separate from mobile device 108. As used herein, a "media content instance" that is displayed by a display device may refer to a depiction of a live event (e.g., a sporting event), a television program (either live or pre-recorded), an on-demand media program, a pay-per-view media program, an advertisement, a movie, an image, or any segment, component, or combination of these or other forms of media content as may serve a particular implementation.

Storage facility 106 may be configured to maintain (e.g., store) data received, generated, managed, maintained, used, and/or transmitted by facilities 102 and 104. In some examples, storage facility 106 may include data used to facilitate operations of facilities 102 and 104 such as buffering spaces for storing image data, program code, variables, intermediate content used in the preparation and/or generation of augmented reality content, and/or any other signals or data used to implement methods and systems described herein as may serve a particular implementation.

Mobile device 108 may be implemented by any suitable mobile computing device. For example, mobile device 108 may be implemented by a mobile phone, a tablet computer, a portable gaming device, and/or any suitable mobile computing device as may serve a particular implementation.

Within mobile device 108, camera 110 may include one or more video cameras (e.g., CMOS image cameras, CCD image cameras, etc.), as well as hardware (e.g., logic, microcontrollers, etc.) and/or software for controlling the one or more video cameras to capture, store, and/or transmit video content. Display screen 112 may include a plurality of pixel blocks (e.g., arrays of one or more pixels) that are configured to display content (e.g., a video feed captured by camera 110 and augmented reality content). To this end, display screen 112 may include or more display components (e.g., LCD light gates, digital micromirror devices, light sources such as arrays of LEDs, etc.), as well as hardware and/or software for controlling the display components.

Figure 2:
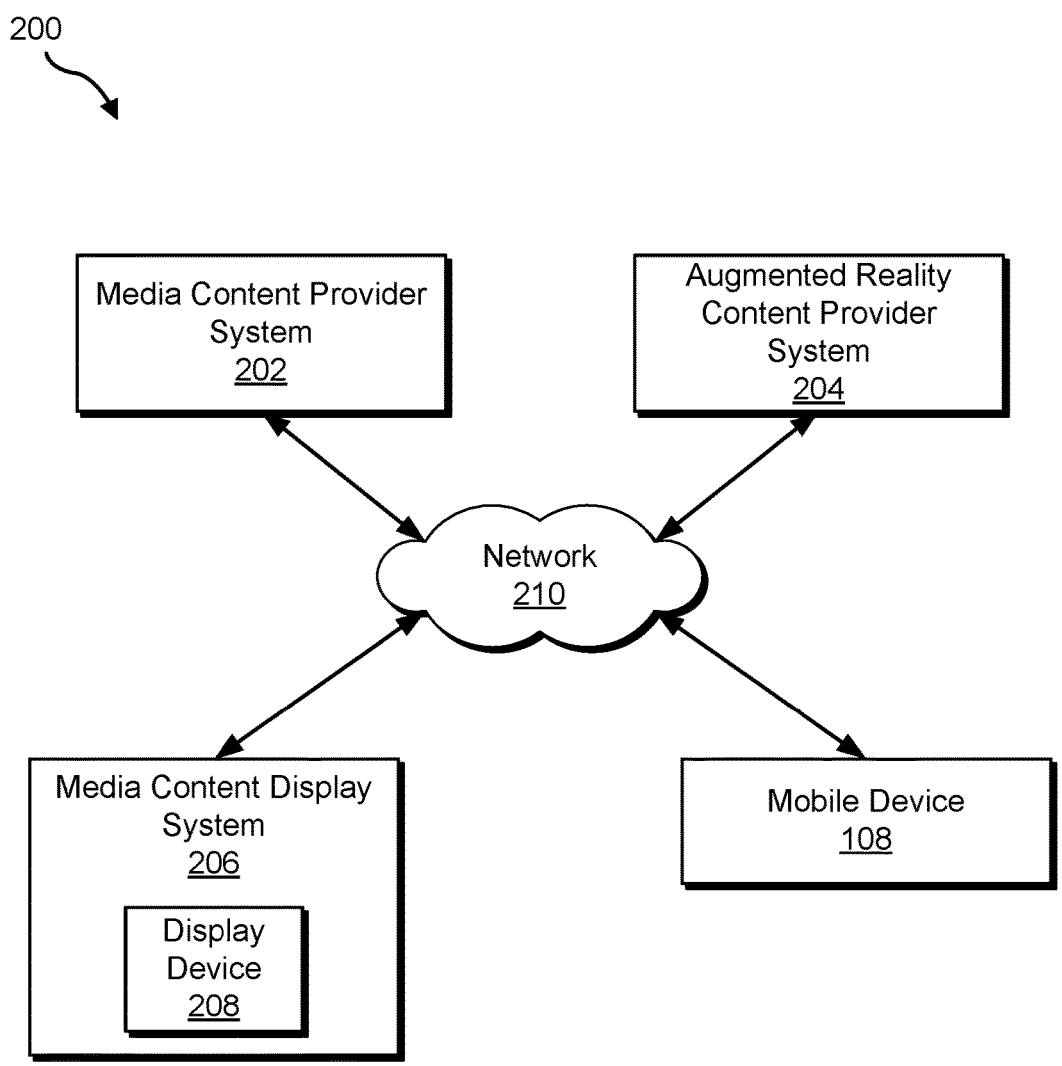
FIG. 2 shows an exemplary configuration wherein the system of FIG. 1 may be implemented by one or more components interconnected by way of a network according to principles described herein.

FIG. 2 shows an exemplary configuration 200 wherein system 100 may be implemented by one or more components interconnected by way of a network. In particular, configuration 200 includes a media content provider system 202, an augmented reality content provider system 204, a media content display system 206 that includes a display device 208, and mobile device 108 configured to communicate by way of a network 210. Network 210 may include a provider-specific wired or wireless network (e.g., a cable or satellite carrier network or a mobile telephone network), the Internet, a wide area network, a content delivery network, or any other suitable network as may serve a particular implementation.

In configuration 200, system 100 may be implemented entirely by media content provider system 202, entirely by mobile device 108, or by a combination of media content provider system 202, augmented reality content provider system 204, media content display system 206, and/or mobile device 108.

Media content provider system 202 may be implemented by any suitable combination of computing devices configured to maintain and/or provide (e.g., broadcast, stream, etc.) media content and/or any related information (e.g., a closed caption stream, metadata, etc.) associated with the media content to media content display system 206. For example, media content provider system 202 may be at least partially implemented by one or more components configured to process and transmit data representative of a media content instance in a format that can be rendered and displayed by media content display system 206. In some examples, media content provider system 202 may maintain data (e.g., audio signature data) that may be used to identify a media content instance being displayed by media content display system 206. Media content provider system 202 may be managed by a network service provider system and/or any other suitable entity.

Augmented reality content provider system 204 may be implemented by any suitable combination of computing devices (e.g., servers) configured to provide augmented reality content for display on display screen 112 of mobile device 108. The augmented reality content may be associated with media content provided by media content provider system 202 for display by media content display system 206. As such, in some alternative examples, media content provider system 202 and augmented reality content provider system 204 may be integrated into a single system. Augmented reality content provider system 204 may provide augmented reality content for display on display screen 112 of mobile device 108 in any suitable manner. For example, augmented reality content provider system 204 may transmit data representative of the augmented reality content to mobile device 108 by way of network 210.

Media content display system 206 may be implemented by any suitable combination of computing devices configured to display media content by way of display device 208. For example, media content display system 206 may be implemented by a set-top box device, a digital video recording device, a personal computer, a streaming device, a gaming device, a television device, and/or any other device configured to process media content and direct display device 208 to display the media content.

Display device 208 may be implemented by a television, a computer monitor, and/or any other suitable device configured to display media content received by media content display system 206. In some examples, media content display system 206 is entirely implemented by display device 208 (i.e., display device 208 may be configured to process and display media content directly without the need for a separate media content processing device such as a set-top box device).

Figure 3B:
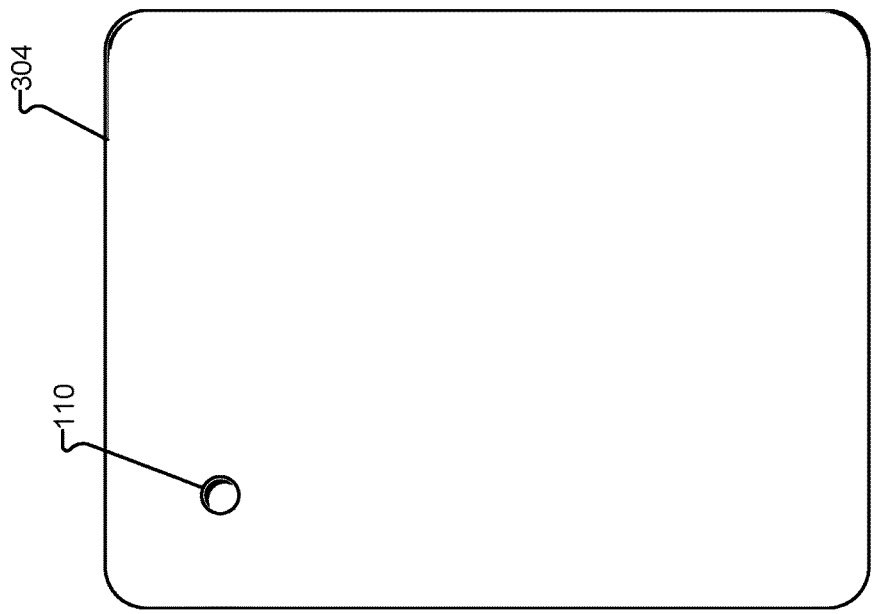
FIGS. 3A and 3B illustrate a front side and a back side, respectively, of an exemplary implementation of a mobile device according to principles described herein.
Figure 3A:
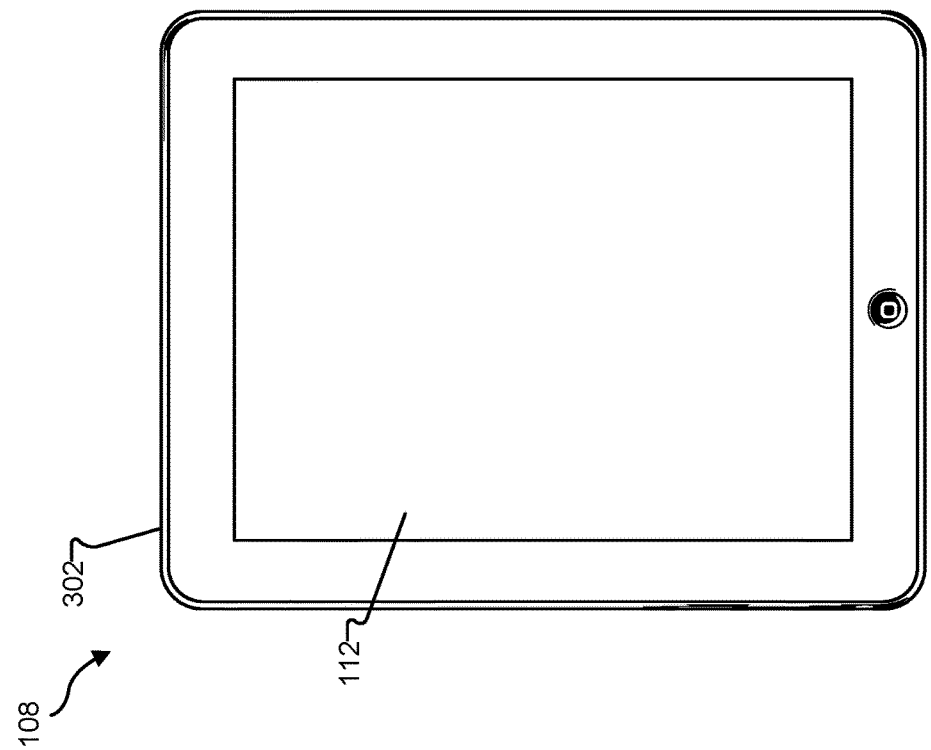

FIGS. 3A and 3B illustrate a front side 302 and a back side 304, respectively, of an exemplary implementation of mobile device 108. As shown, a portion of camera 110 (e.g., a camera lens) may be disposed on back side 304 of mobile device 108. In this configuration, camera 110 may capture a video feed of a portion of a real-world environment that is in a field of view of camera 110 while, for example, a user holds mobile device 108 in his or her hands. Display screen 112 may be disposed on front side 302 of mobile device 108. Display screen 112 may be configured to display various types of content, including a video feed captured by camera 110 and augmented reality content. In some examples, display screen 112 may be a touch screen by way of which a user may make one or more selections, provider user input, and/or navigate through information and/or display elements displayed on display screen 112. Although FIGS. 3A and 3B illustrate one particular implementation of mobile device 108, the systems and methods disclosed herein may be used in connection with any other suitable implementation of mobile device 108 as may serve a particular implementation.

Various examples of the operations that may be performed by system 100 will now be described. It will be recognized that the examples described herein are merely illustrative of the many different ways in which system 100 may present augmented reality content to a user.

Figure 4:
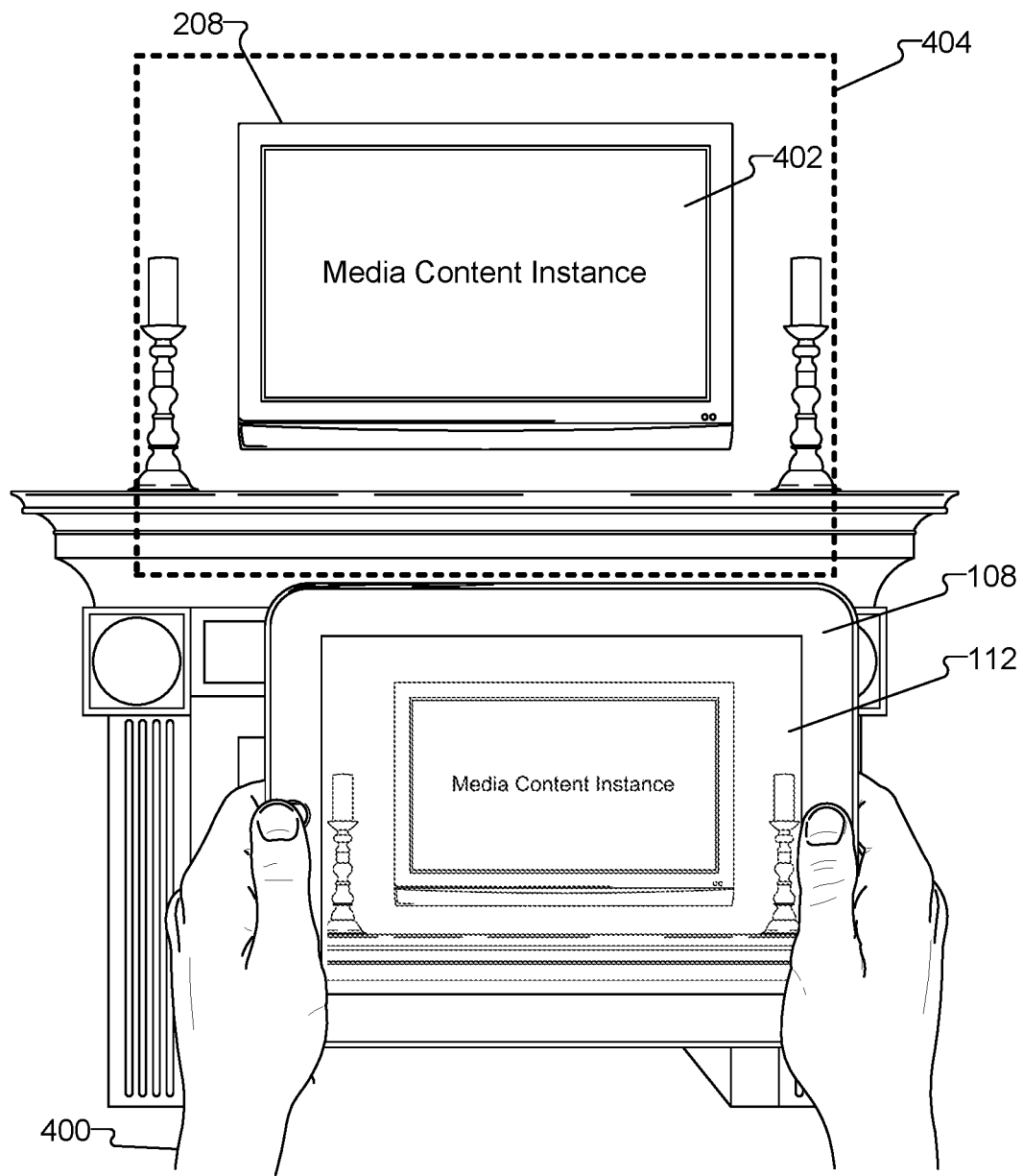
FIG. 4 illustrates an exemplary scenario in which a user may desire to access augmented reality content associated with a media content instance being displayed by a display device according to principles described herein.

FIG. 4 illustrates an exemplary scenario in which a user 400 may desire to access (e.g., view) augmented reality content associated with a media content instance being displayed by display device 208. As shown, display device 208 is physically located with a real-world environment of the user 400 and is displaying a media content instance within a display screen 402 of the display device 208. The media content instance may be any type of media content instance as described herein.

Display device 208 may have a refresh rate associated therewith. In other words, display device 208 may periodically refresh (i.e., regenerate for display) content at a certain frequency. For example, the refresh rate of display device 208 may be between about 60 Hertz ("Hz") and 240 Hz, or any other suitable frequency. In some examples, the refresh rate is high enough to prevent the human eye from noticing that the displayed content is being periodically refreshed. However, as will be described below, the periodic refreshing of content by display device 208 may be detected by system 100 in order to ascertain where a video depiction of display device 208 is displayed within display screen 112.

As shown, user 400 may utilize mobile device 108 to capture a video feed of a portion of the real-world environment and display the captured video feed within the display screen 112 of mobile device 108. For example, user 400 may aim camera 110 (not shown in FIG. 4) of mobile device 108 at display device 208 such that display device 208 is included within a field of view 404 of camera 110. As shown, various other objects within the real-world environment may also be included within field of view 404 and thereby included in the video feed captured by camera 110. In some examples, camera 110 may begin capturing the video feed in response to a selection by the user 400 of an option (e.g., a record option displayed within display screen 112), in response to a selection by the user 400 of an application executed by mobile device 108 (e.g., a mobile app provided by media content provider system 202 and/or augmented reality content provider system 204), and/or in any other manner.

As shown, as the video feed is captured by camera 110, the video feed may be displayed within display screen 112 of mobile device 108. Because camera 110 is aimed at display device 208 in the example of FIG. 4, a video depiction of the display device 208 is displayed within the display screen 112 of mobile device 108. As will be described below, the video depiction of the display device 208 is displayed within a particular pixel region of the display screen 112 that corresponds to a position of the display device 208 within the field of view 404 of camera 110.

In some examples, it may be desirable to display augmented reality content associated with the media content instance being displayed by display device 208 within the pixel region of display screen 112 that displays the video depiction of display device 208. In this manner, as the user looks at display screen 112 of mobile device 108, augmented reality content may appear to take over, replace, or otherwise augment the media content instance being displayed within the video depiction of the display device 208.

For example, the media content instance being displayed by display device 208 may be a live event, such as a performance at a halftime show of a football game. During the performance, a performer may announce that during a portion of the performance (e.g., before, during, or after), users can access augmented reality content (e.g., bonus features, such as videos, lyrics, profile information, etc.) associated with the performance on their devices by using a particular application on their devices and pointing the cameras of their devices at the particular display device they are using to watch the performance. Accordingly, if a user is watching the performance on a television and launches the application, the methods and systems described herein may facilitate display of augmented reality content associated with the performance within a display screen of the user's device while the user aims the camera of the device at the television. In particular, the methods and systems described herein may facilitate display of the augmented reality content within the display screen of the mobile device in a manner that makes it appear, from the perspective of the user viewing the display screen of the device, as though the television is displaying the augmented reality content in place of the performance.

To facilitate display of augmented reality content in this manner, system 100 may identify a pixel region within display screen 112 that corresponds to a position of display device 208 within the field of view 404 of camera 110. This may be performed in any suitable manner. For example, system 100 may identify, while mobile device 108 displays the video feed within display screen 112, a plurality of adjacent pixel blocks within display screen 112 that have signal characteristics that uniformly vary by more than a threshold amount over a predetermined time period. Based on the uniformly varying signal characteristics, which, as described herein, may be caused by display device 208 periodically refreshing its displayed content, system 100 may determine that the pixel blocks together constitute a pixel region that corresponds to a position of display device 208 within field of view 404 of camera 110.

Figure 5:
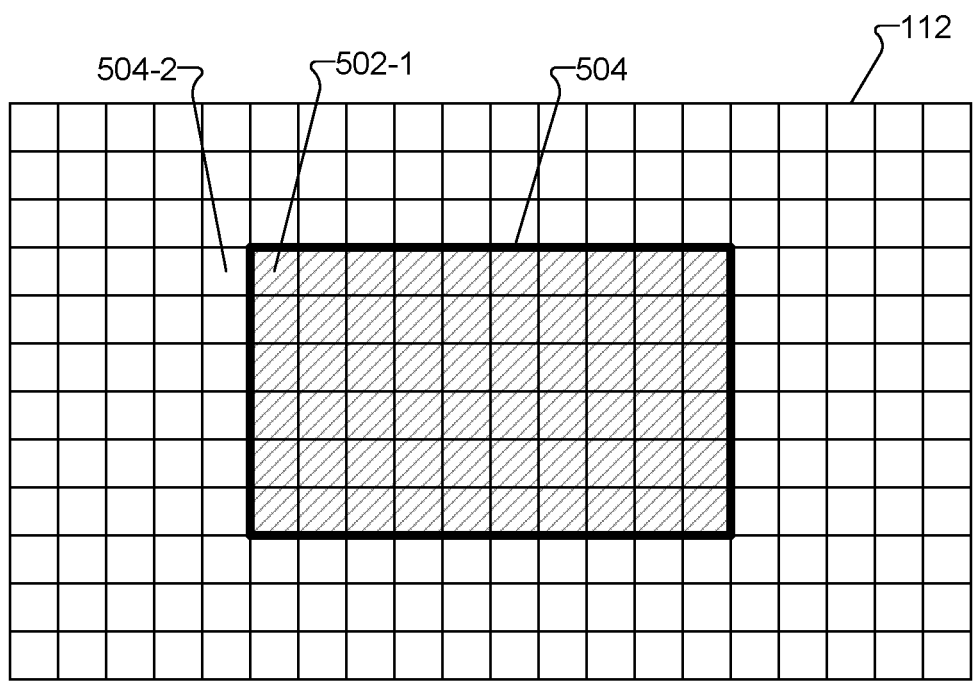
FIG. 5 shows that a display screen of a mobile device may be divided into a plurality of pixel blocks according to principles described herein.

To illustrate, FIG. 5 shows that display screen 112 may be divided into a plurality of pixel blocks (e.g., pixel block 502-1 and pixel block 502-2). Each pixel block may include one or more individual pixels. For example, a pixel block may include only one single pixel, four pixels, nine pixels, or any other suitable number of pixels. The pixel(s) included in a pixel block may be arranged in the form of a square array (e.g., a two by two pixel array) or in any other shape (e.g., a four by one pixel array) as may serve a particular implementation. The pixel blocks shown in FIG. 5 may correspond to pixel blocks in an original video frame or pixel blocks in a subsampled portion of the video frame.

In order to ascertain where a video depiction of display device 208 is displayed within display screen 112, system 100 may track how a signal characteristic of each of the pixel blocks included within display screen 112 varies over a predetermined time period. The signal characteristic may include a peak signal-to-noise ratio, a pixel brightness value, a structured similarity index value, and/or any other metric that may be used to identify pixel blocks within display screen 112 that uniformly vary in a manner that indicates that the pixel blocks are displaying content that is periodically being refreshed by a source (e.g., a display device) other than mobile device 108.

If the tracked signal characteristic of a particular pixel block varies more than a threshold amount over a predetermined time period, and if the variance is uniform with (e.g., within a predetermined tolerance range of) the variance of other pixel blocks that have signal characteristics that vary more than the threshold amount over the predetermined time period, system 100 may determine that the pixel block is displaying a portion of the video depiction of display device 208 (i.e., that the pixel block is included in a pixel region that corresponds to a position of display device 208 within field of view 404 of camera 110).

To illustrate, in the particular example of FIG. 5, system 100 has determined that each of the pixel blocks (e.g., pixel block 502-1) that are included within border 504 have signal characteristics that uniformly vary by more than a threshold amount over a predetermined time period. These pixel blocks together constitute a pixel region that corresponds to a position of display device 208 within the field of view 404 of camera 110. It will be recognized that the pixel region specifically depicts the display screen 402 of display device 208. As such, portions of the display device 208 that surround display screen 402, such as the physical edges of display device 208, may be displayed within a portion of display screen 112 that is outside the pixel region. Hence, a pixel region that "corresponds to" a position of a display device within a field of view of a camera of a mobile device may include pixel blocks that display a video depiction of a display screen of the display device.

An example of system 100 determining whether a pixel block has a signal characteristic that varies by more than a threshold amount over a predetermined time period will now be described. In this example, the signal characteristic that is tracked by system 100 is peak signal-to-noise ratio ("PSNR"). The PSNRs may be indicative of noise (i.e., how much change there is) between successive frames in a video feed. Because display device 208 refreshes its display content at a constant refresh rate, the PSNR of a pixel block included in display screen 112 that corresponds to a position of display device 208 within field of view 404 of camera 110 will correspondingly vary.

By way of example, assume that a pixel block within display screen 112 comprises an array of n by m pixels, where n represents the number of columns of pixels in the array and m represents the number of rows of pixels in the array. The PSNR of the pixel block between two successive frames may be represented by $$PSNR = 20 \log_{10}\left(\frac{MAX_f}{\sqrt{MSE}}\right),$$

where $$MSE = \frac{1}{mn}\sum_{0}^{m-1}\sum_{0}^{n-1}\|f(i,j) - g(i,j)\|^2.$$

In these equations, f represents a pixel block value (e.g., a brightness value or any other indicator of energy output by the pixel block during a first frame), g represents a pixel block value for the pixel block during a second frame subsequent to the first frame, m represents the numbers of rows of pixels of the pixel block, i represents the index of a row in the pixel block, n represents the number of columns of pixels of the pixel block, j represents the index of a column in the pixel block, and $MAX_f$ represents a maximum possible pixel block value for the pixel block (e.g., if the pixel block value is represented by eight bits, the maximum possible pixel block value may be 255).

Using these equations, system 100 may determine a plurality of successive PSNR values for particular pixel block over a predetermined amount of time. The predetermined amount of time may be any suitable amount of time (e.g., a couple seconds) that allows system 100 to ascertain whether the PSNR is varying by more than a threshold amount. As shown in the equations above, each PSNR value may be obtained by determining a pixel block value for the pixel block during each of a plurality of successive frames. As used herein, a "frame" may refer to a particular image in a video feed. The number of frames that may be processed by system 100 in a given time interval may be defined by a sampling rate at which system 100 samples the video feed to determine the pixel block values. For example, if the sampling rate is 500 Hz, system 100 may acquire 500 samples per second, which means that system 100 may process 500 frames per second to determine 500 pixel block values per second. The sampling rate used by system 100 to determine the pixel block values (and hence the PSNR values) may be any suitable sampling rate. In some examples, system 100 uses a sampling rate that is greater than the refresh rate of display device 208 in order to ensure that system 100 can detect each transition between maximum and minimum PSNR values, as will be described in more detail below.

To determine a pixel block value for a particular pixel block for a particular frame in accordance with the equations above, system 100 may analyze data within the frame that corresponds to coordinates of the pixel block within the frame. For example, if a particular pixel block is located in the bottom right corner of display screen 112, system 100 may determine a pixel block value for the pixel block by analyzing data within the frame that corresponds to a bottom right corner of the frame.

Figure 6:
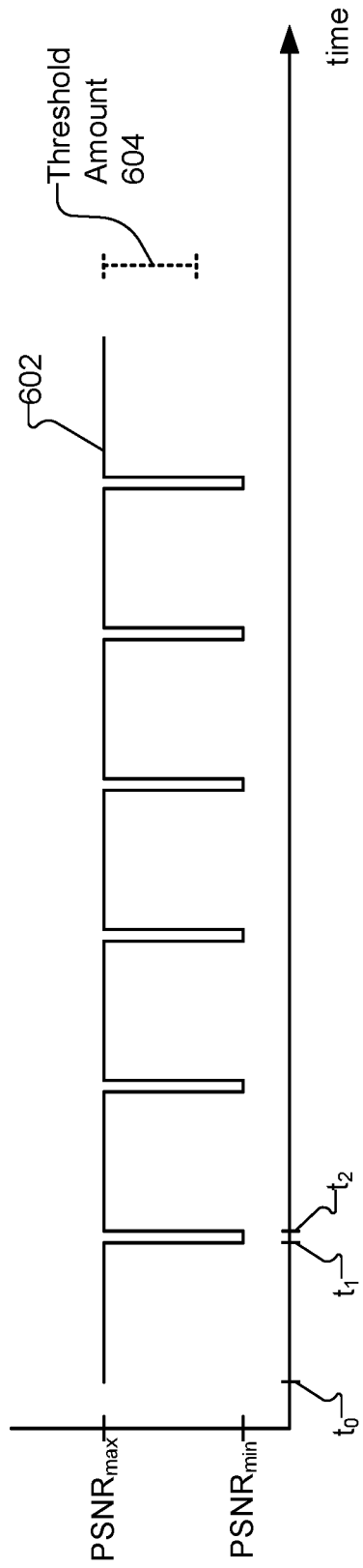
FIG. 6 shows an exemplary peak signal-to-noise ratio waveform for a pixel block of a display screen of a mobile device according to principles described herein.

FIG. 6 shows an exemplary PSNR waveform 602 that may be generated by system 100 in accordance with the equations above and that represents how a PSNR of a particular pixel block (e.g., pixel block 502-1) may vary over time. As shown, during certain phases (e.g., between time $t_0$ and $t_1$), the PSNR of the pixel block is at a maximum level ($PSNR_{max}$). This means that during these phases, there is little or no noise (i.e., change) that occurs within the pixel block from frame to frame. However, during other phases (e.g., between times $t_1$ and $t_2$), the PSNR of the pixel block is at a minimum level ($PSNR_{min}$). These transitions from the maximum PSNR level to the minimum PSNR level are indicative of a relatively large amount of noise (i.e., change) that occurs between select frames. As shown, the length of the phases at which the PSNR of the pixel block is at the minimum level may be relatively short. For example, each of these phase lengths may be associated with a single PSNR sample acquired by system 100.

The periodic transitions from the maximum PSNR level to the minimum PSNR level for the pixel block may be caused by a refresh rate of a display device (e.g., display device 208) positioned within field of view 404 of camera 110. In other words, each time display device 208 refreshes content that is being displayed within display screen 402, system 100 may detect a corresponding transition in PSNR values for various pixel blocks of display screen 112 of mobile device 108.

In some examples, system 100 may track how the PSNR of a pixel block varies during a predetermined time period to determine whether the pixel block could potentially be displaying a portion of a video depiction of display device 208. For example, the PSNR of the pixel block as represented by waveform 602 varies between $PSNR_{max}$ and $PSNR_{min}$. In this case, if system 100 determines that the difference between $PSNR_{max}$ and $PSNR_{min}$ is greater than a threshold amount 604, system 100 may determine that the pixel block could potentially be displaying a portion of a video depiction of display device 208. Alternatively, if system 100 determines that the difference between $PSNR_{max}$ and $PSNR_{min}$ is not greater than the threshold amount 604, system 100 may determine that the pixel block is not displaying a portion of a video depiction of display device 208. In the example of FIG. 6, the variance of PSNR waveform 602 is greater than threshold amount 604. Hence system 100 may determine that the pixel block could potentially be displaying a portion of a video depiction of display device 208.

It will be recognized that the maximum and minimum PSNR values for a particular pixel block during a particular time period may slightly vary depending on the particular content being displayed by display device 208. Hence, in some cases, system 100 may average each of the local maximum PSNRs detected during the particular time period and each of the local minimum PSNRs detected during the particular time period and determine the difference between the averaged maximum and minimum values in order to ascertain the variance of the PSNR of the pixel block.

In some examples, system 100 may determine whether other pixel blocks adjacent to the pixel block also have PSNR values that vary more than threshold amount 604. If they do, and if the variance of each of the pixel blocks is uniform in manner (e.g., if the amount of variation for each pixel block is within a predetermined tolerance range of each other and/or if the transitions from the maximum to minimum PSNR levels occur at substantially the same time for each of the pixel blocks), system 100 may determine that the pixel blocks together constitute a pixel region that corresponds to a position of display device 208 within field of view 404 of camera 110.

It will be recognized that display screen 112 may also have a refresh rate associated therewith. The refresh rate of display screen 112 may be the same or different than the refresh rate of display device 208. The refresh rate of display screen 112 may cause all of the content displayed by display screen 112 to periodically refresh. Because of this, system 100 may identify changes in PSNR that are common to all of the pixel blocks within display screen 112 and ignore such changes when determining whether a particular pixel block is displaying a portion of the video depiction of display device 208.

While the example above refers to PSNR, other signal characteristics may also be used in a similar manner to identify a pixel region that corresponds to a position of display device 208 within field of view 404 of camera 110. For example, system 100 may track pixel brightness values, structured similarity index values, and/or any other suitable signal characteristic and use the tracked values in a similar manner to determine whether a pixel block is displaying a portion of video depiction of display device 208.

System 100 may additionally or alternatively identify a pixel region within display screen 112 that corresponds to a position of display device 208 within the field of view 404 of camera 110 in any other suitable manner. For example, system 100 may identify a visual marker that has been inserted into the transport stream that carries data representative of the media content instance being displayed by display device 208. To illustrate, the media content instance may be pre-recorded (i.e., a non-live event). In this case, it may be computationally feasible for media content provider system 202 to process and insert one or more visual markers that can be recognized by mobile device 108 (and, in some cases, not perceivable by a user of mobile device 108) into a transport stream that carries data representative of the media content instance. Display device 208 may display the one or more visual markers as display device 208 displays the media content instance. System 100 may direct mobile device 108 to detect the one or more visual markers in any suitable manner and thereby identify the pixel region within display screen 112 that is displaying the video depiction of display device 208.

Once system 100 has determined that display device 208 is in field of view 404 of camera 110, system 100 may identify the media content instance being displayed by display device 208. This may be performed in any suitable manner. For example, system 100 may detect (or direct mobile device 108 to detect) an attribute associated with the media content instance and identify the media content instance based on the detected attribute. Exemplary attributes that may be detected and used by system 100 to identify a media content instance being displayed by display device 208 include, but are not limited to, a visual attribute (e.g., an image or other type of visual marker inserted into a transport stream that carries data representative of the media content instance and that is specifically configured to identify the media content instance), an audio attribute (e.g., an audio marker that is detectable by mobile device 108 but that is not detectable by a user, an audio clip from the media content instance, etc.), a text attribute (e.g., a closed captioning stream associated with the media content instance), a metadata attribute (e.g., non-audiovisual data transmitted together with data representative of the media content instance within a transport stream), and/or any other suitable attributes associated with the media content instance.

By way of example, system 100 may direct mobile device 108 to use a microphone to detect an audio clip associated with the video feed. The audio clip may include sound generated by various sources within the real-world environment of the user. If the volume level of display device 208 (or another component included in media content display system 206) is sufficiently high, the detected audio clip may include audio content associated with the media content instance being displayed by display device 208. System 100 may acquire the audio clip from mobile device 108 (in cases where system 100 is implemented by one or more computing devices separate from mobile device 108) and access a database of audio signatures maintained by a server remote from mobile device 108. Each audio signature in the database may correspond to a distinct media content instance included in a plurality of media content instances. System 100 may compare the audio clip to the audio signatures in the database. If the audio clip matches a particular audio signature included in the database, system 100 may determine that display device 208 is displaying a particular media content instance that corresponds to the particular audio signature.

As another example, the media content instance may be a live event being displayed by display device 208 in substantially real time as the live event occurs. In this case, one or more microphones may be physically disposed at the live event and configured to record an audio signature in real time as the live event occurs. Data representative of the audio signature may be transmitted to a server, which may store data representative of the audio signature as the audio signature is generated. In this case, system 100 may access this data (e.g., in response to the user initiating an application on the mobile device 108 that is used to facilitate display of augmented reality content) and compare an audio clip detected by mobile device 108 with the audio signature while display device 208 displays the media content instance. Based on this comparison (e.g., if there is a match between the audio clip and the audio signature), system 100 may determine an identity of the media content instance being displayed by display device 208.

As another example, system 100 may identify a media content instance being displayed by display device 208 by directing mobile device 108 to establish a communication channel between mobile device 108 and a computing device that controls display device 208. The computing device may be a set-top box or other media content processing device coupled to display device 208, a computing device housed within display device 208 itself, and/or any other type of computing device that controls display device 208. The communication channel may be a local area network communication channel, a direct link between mobile device 108 and the computing device (e.g., a Bluetooth link, an infrared link, a near field communication link, etc.). System 100 may then direct mobile device 108 to query the computing device by way of the communication channel for data representative of the identity of the media content instance. This may be performed in any suitable manner.

Once system 100 has identified the media content instance being displayed by display device 208, system 100 may identify augmented reality content associated with the media content instance. This may be performed in any suitable manner. For example, system 100 may use the identity of the media content instance to search a database, the Internet, or another source for augmented reality content related to or otherwise associated with the media content instance. In some examples, system 100 may additionally identify the augmented reality content based on one or more traits of the user. For example, different instances of augmented reality content may be displayed to different users on different mobile devices depending differing traits (e.g., age, gender, viewing history, geographic locations, etc.) of the users.

In some examples, system 100 may determine a start time at which the augmented reality content is to begin being displayed within display screen 112 and abstain from directing mobile device 118 to display the augmented reality content within display screen 112 until the determined start time. For example, as mentioned above, the media content instance being displayed by display device 208 may be a live event, such as a performance at a halftime show of a football game. During the performance, a performer may announce that a particular time during the performance, viewers can access augmented reality content (e.g., bonus features) associated with the performance on their mobile devices. In this example, system 100 may prevent mobile device 108 from displaying the augmented reality content until the particular time.

System 100 may determine a start time at which the augmented reality content is to begin being displayed within display screen 112 in any suitable manner. For example, system 100 may detect a trigger (e.g., a trigger inserted into a transport stream that carries data representative of the media content instance) representative of the start time within the video feed captured by camera 110 and/or an audio trigger representative of the start time within an audio stream associated with the video feed. Additionally or alternatively, system 100 may receive data representative of the start time from a source (e.g., media content provider system 202 and/or augmented reality content provider system 204) other than the video feed or the audio stream.

Figure 7:
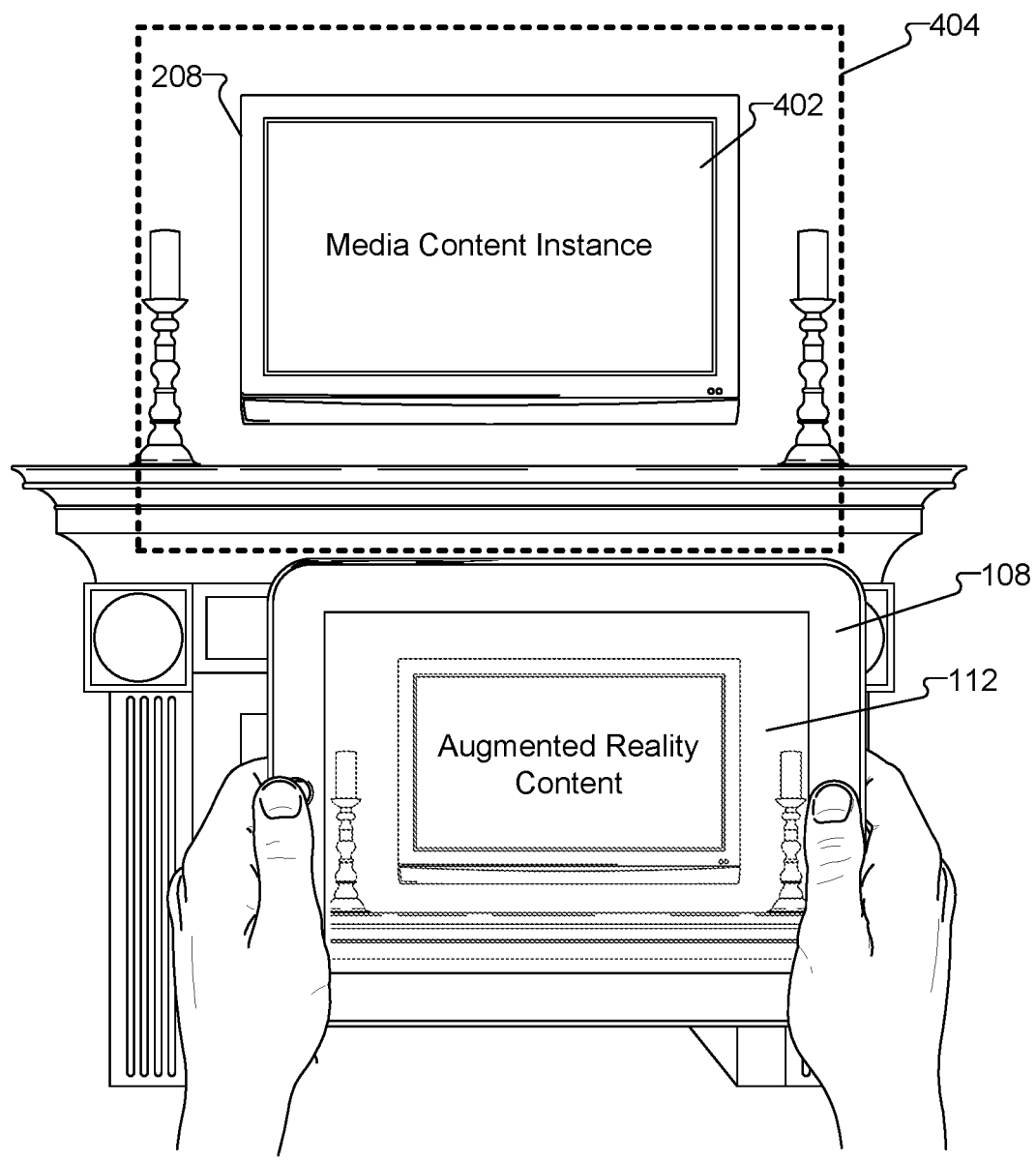
FIGS. 7-9 show various manners in which augmented reality content may be presented to a user according to principles described herein.

System 100 may direct mobile device 108 to display the augmented reality content within display screen 112 in any suitable manner. For example, system 100 may direct mobile device 108 to display the augmented reality content within the pixel region of display screen 112 that would otherwise display a video depiction of display device 208. In so doing, system 100 may direct mobile device 112 to completely replace a portion of the video feed captured by camera 110 that would otherwise be displayed within the pixel region with the augmented reality content. For example, FIG. 7 shows that augmented reality content is now displayed within the pixel region of display screen 112 that previously displayed (e.g., in FIG. 4) the video depiction of display device 208.

Alternatively, system 110 may direct mobile device 112 to overlay the augmented reality content on top of the portion of the video feed that is being displayed within the pixel region in a manner that does not completely obscure the media content instance being displayed therein. In some examples, the augmented reality content may additionally be displayed in one or more regions of display screen 112 that are outside the pixel region that displays the video depiction of display device 208.

In some examples, while augmented reality content is being displayed within display screen 112, system 100 may detect movement of mobile device 108 and/or camera 110 by, for example, utilizing and/or communicating with one or more motion sensors (e.g., accelerometers, gyroscopes, etc.) of mobile device 108. In response to this movement, system 100 may identify a new pixel region (i.e., a new group of pixel blocks) within display screen 112 that corresponds to the position of display device 208 within field of view 404 of camera 110. This may be performed in any suitable manner. For example, in response to movement of mobile device 108 and/or camera 110, system 100 may again track and analyze signal characteristics of various pixel blocks within display screen 112, as described above. Additionally or alternatively, other tracking techniques (e.g., pose estimation, etc.) may be used to dynamically determine which pixel blocks are to be included in the new pixel region that corresponds to the position of display device 208 within field of view 404 of camera 110. Once the new pixel region has been identified, system 100 may direct mobile device 108 to shift the display of the augmented reality content to the new pixel region.

In some examples, system 100 may prevent certain types of users from accessing augmented reality content associated with a media content instance being displayed by display device 208. For example, system 100 may identify a trait of the user of mobile device 108 and determine, based on the identified trait, whether the user is permitted to view augmented reality content associated with a media content instance being displayed by display device 208. If, based on the identified trait, system 100 determines that the user is permitted to view the augmented reality content, system 100 may direct mobile device 108 to display the augmented reality content. However, if, based on the identified trait, system 100 determines that the user is not permitted to view the augmented reality content, system 100 may prevent mobile device 108 from displaying the augmented reality content. The trait of the user identified by system 100 may be any suitable trait, such as a subscription status of the user (e.g., whether the user is a subscriber of a certain mobile carrier service and/or augmented reality content presentation service), an age of the user, a geographic location of the user, etc.

In some examples, in response to mobile device 108 displaying augmented reality content within the pixel region of display screen 112 that corresponds to the position of display device 208 within field of view 404 of camera 110, system 100 may decrease (e.g., mute) a volume level output by display device 208 and/or any other component of media content display system 206. This may be performed in any suitable manner. For example, system 100 may transmit, either via mobile device 108 and/or via network 210) a command to media content display system 206 to decrease the volume level while mobile device 108 displays the augmented reality content. In this manner, the user may more easily pay attention to the augmented reality content. As another example, in response to mobile device 108 displaying augmented reality content within the pixel region of display screen 112 that corresponds to the position of display device 208 within field of view 404 of camera 110, system 100 may replace the audio associated with the media content instance and output by display device 208 and/or any other component of media content display system 206 with audio associated with the augmented reality content. This may be performed in any suitable manner. For example, system 100 may transmit, either via mobile device 108 and/or via network 210) a command to media content display system 206 to replace the audio associated with the media content instance with audio associated with the augmented reality content.

Figure 8:
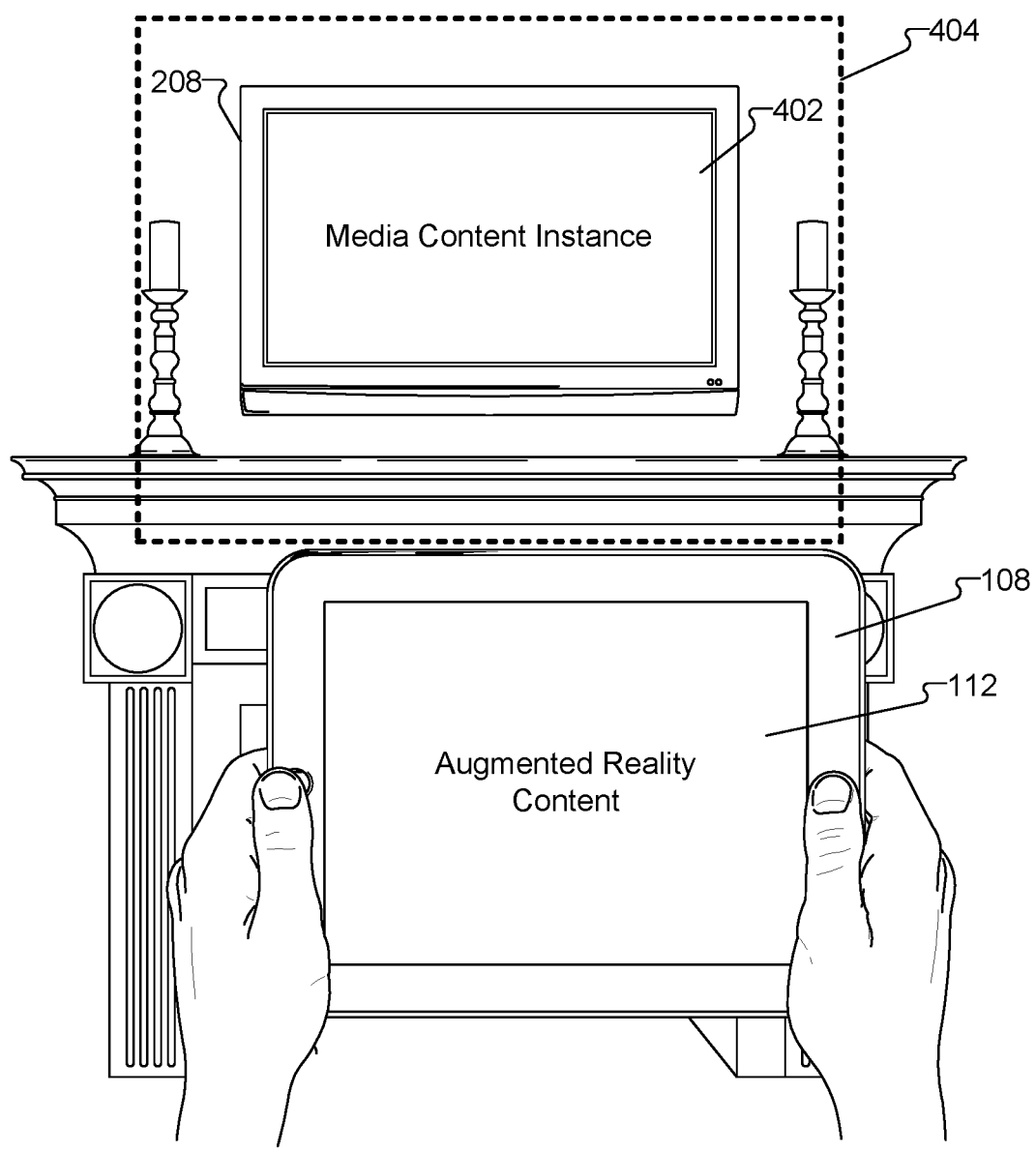

A user may interact with augmented reality content being displayed on display screen 112 in any suitable manner. For example, while mobile device 108 is displaying augmented reality content within the pixel region of display screen 112 that corresponds to a position of display device 208 within field of view 404 of camera 110, system 100 may detect a user input command representative of a request to resize (e.g., enlarge) a display of the augmented reality content within display screen 112. The user input command may be provided by the user in any suitable manner. For example, the user input command may include a touch gesture (e.g., a reverse pinch) performed with respect to display screen 112, a spoken command, a selection of a button on mobile device 108, and/or any other suitable type of user input as may serve a particular implementation. In response to the user input command, system 100 may direct mobile device 108 to display the augmented reality content within a portion of display screen 112 that is different (e.g., larger) than the pixel region of display screen 112 that corresponds to the position of display device 208 within field of view 404 of camera 110. For example, FIG. 8 shows that the augmented reality content has been resized to occupy the entire display screen 112.

Figure 9:
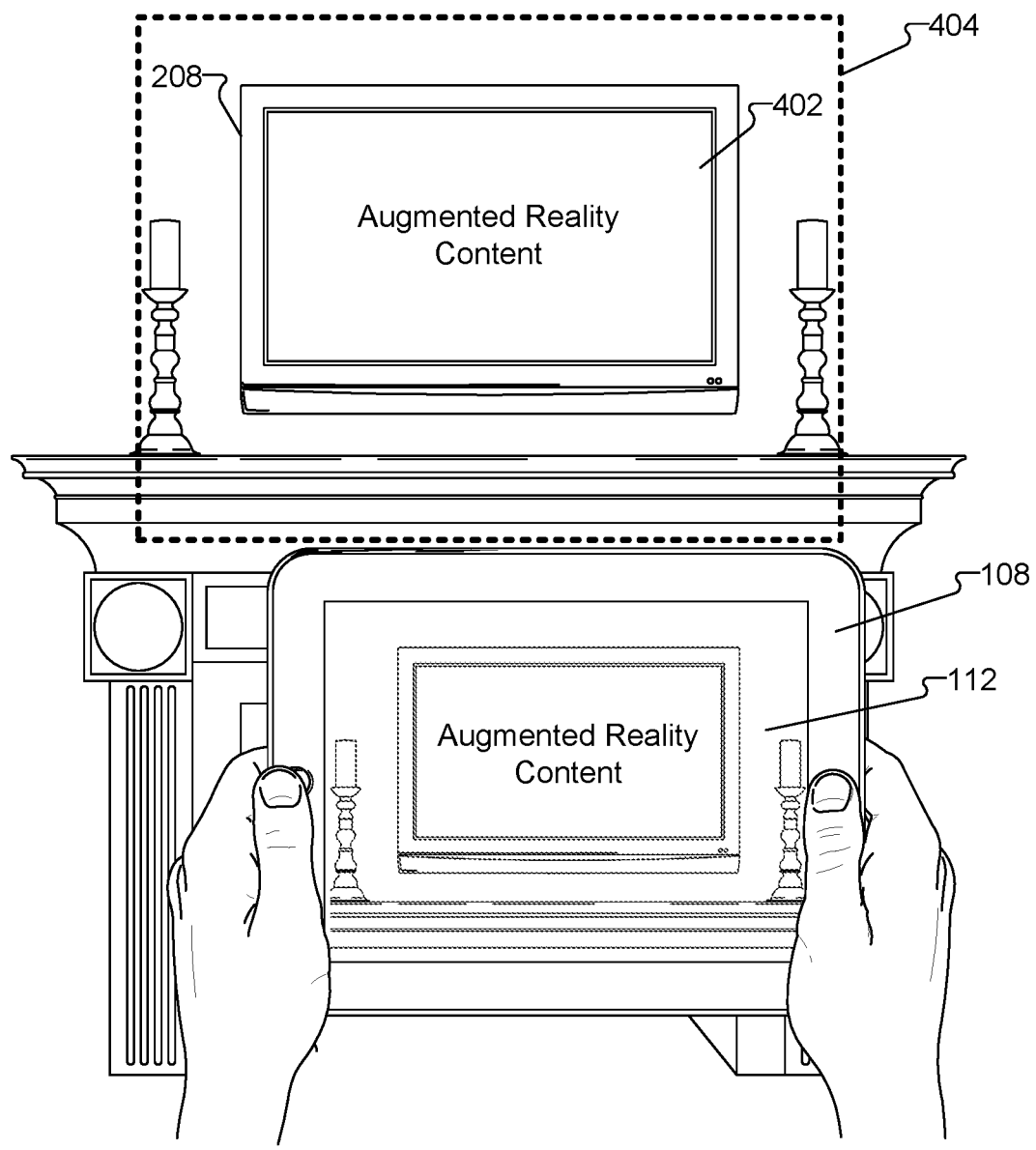

As another example, while mobile device 108 is displaying augmented reality content within the pixel region of display screen 112 that corresponds to a position of display device 208 within field of view 404 of camera 110, system 100 may detect a user input command representative of a request to display the augmented reality content on display device 208. The user input command may be provided by the user in any of the ways described herein. In response to the user input command and as illustrated in FIG. 9, system 100 may direct display device 208 (e.g., by communicating with a component included in media content display system 206) to begin displaying the augmented reality content.

Figure 10:
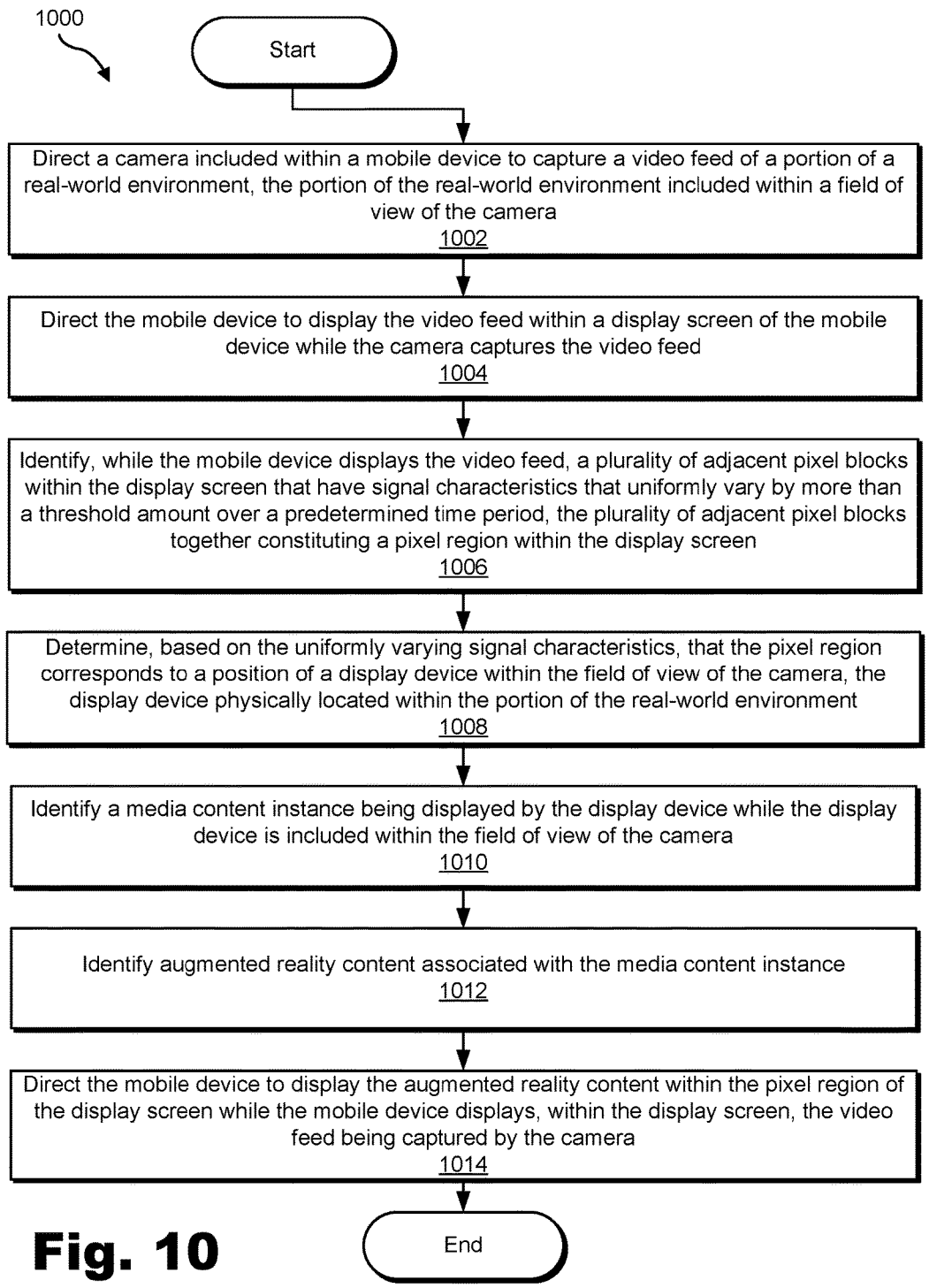
FIG. 10 illustrates an exemplary method of displaying augmented reality content associated with a media content instance according to principles described herein.

FIG. 10 illustrates an exemplary method 1000 of displaying augmented reality content associated with a media content instance. While FIG. 10 illustrates exemplary operations according to one embodiment, other embodiments may omit, add to, reorder, and/or modify any of the operations shown in FIG. 10. One or more of the operations shown in FIG. 10 may be performed by system 100 and/or by any implementations thereof.

In operation 1002, an augmented reality presentation system directs a camera included within a mobile device to capture a video feed of a portion of a real-world environment, the portion of the real-world environment included within a field of view of the camera. Operation 1002 may be performed in any of the ways described herein.

In operation 1004, the augmented reality presentation system directs the mobile device to display the video feed within a display screen of the mobile device while the camera captures the video feed. Operation 1004 may be performed in any of the ways described herein.

In operation 1006, the augmented reality presentation system identifies, while the mobile device displays the video feed within the display screen, a plurality of adjacent pixel blocks within the display screen that have signal characteristics that uniformly vary by more than a threshold amount over a predetermined time period. As described above, the plurality of adjacent pixel blocks together constitute a pixel region within the display screen. Operation 1006 may be performed in any of the ways described herein.

In operation 1008, the augmented reality presentation system determines, based on the uniformly varying signal characteristics, that the pixel region corresponds to a position of a display device within the field of view of the camera, the display device physically located within the portion of the real-world environment. Operation 1008 may be performed in any of the ways described herein.

In operation 1010, the augmented reality presentation system identifies a media content instance being displayed by the display device while the display device is included within the field of view of the camera. Operation 1010 may be performed in any of the ways described herein.

In operation 1012, the augmented reality presentation system identifies augmented reality content associated with the media content instance. Operation 1012 may be performed in any of the ways described herein.

In operation 1014, the augmented reality presentation system directs the mobile device to display the augmented reality content within the pixel region of the display screen while the mobile device displays, within the display screen, the video feed being captured by the camera. Operation 1014 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 11:
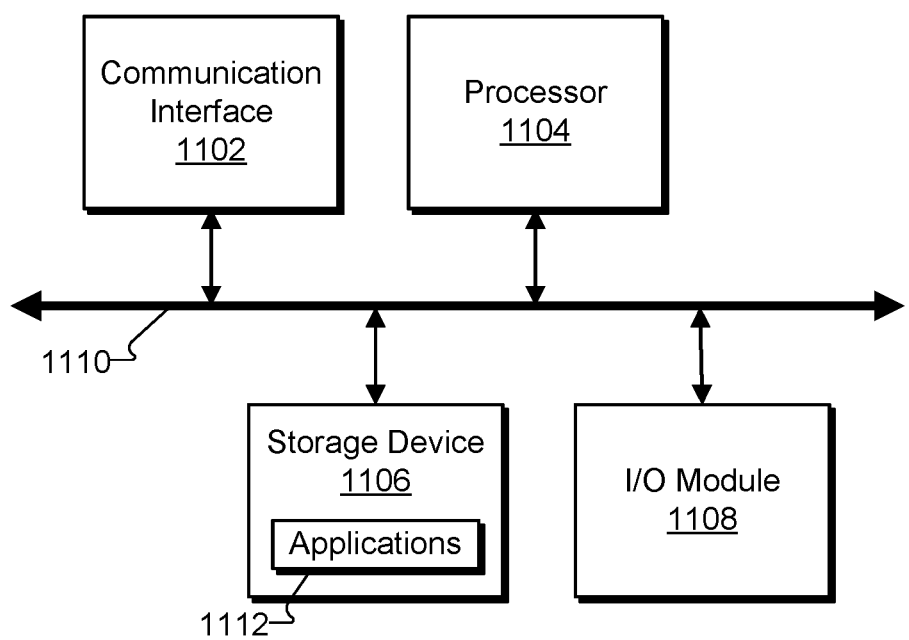
FIG. 11 illustrates an exemplary computing device according to principles described herein.

FIG. 11 illustrates an exemplary computing device 1100 that may be specifically configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may include one or more I/O modules configured to receive user input and provide user output. One or more I/O modules may be used to receive input for a single virtual experience. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with facilities 102 and 104 of system 100. Likewise, storage facility 106 of system 100 may be implemented by or within storage device 1106.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    directing, by an augmented reality presentation system, a camera included within a mobile device to capture a video feed of a portion of a real-world environment, the portion of the real-world environment included within a field of view of the camera;
    directing, by the augmented reality presentation system, the mobile device to display the video feed within a display screen of the mobile device while the camera captures the video feed;
    determining, by the augmented reality presentation system, a plurality of successive peak signal-to-noise ratios (PSNRs) for a plurality of pixel blocks within the display screen of the mobile device;
    determining, by the augmented reality presentation system based on the successive PSNRs for the plurality of pixel blocks, maximum PSNR values and minimum PSNR values for each of the plurality of pixel blocks;
    identifying, by the augmented reality presentation system based on the maximum PSNR values and the minimum PSNR values, a plurality of adjacent pixel blocks within the display screen of the mobile device that have PSNR values that vary by more than a threshold amount over a predetermined time period, the plurality of adjacent pixel blocks together constituting a pixel region within the display screen;
    determining, by the augmented reality presentation system based on the uniformly varying PSNR values, that the pixel region of the display screen of the mobile device corresponds to a position of a display device within the field of view of the camera, the display device physically located within the portion of the real-world environment;
    identifying, by the augmented reality presentation system, a media content instance being displayed by the display device while the display device is included within the field of view of the camera;
    identifying, by the augmented reality presentation system, augmented reality content associated with the media content instance; and
    directing, by the augmented reality presentation system, the mobile device to display the augmented reality content within the pixel region of the display screen while the mobile device displays, within the display screen, the video feed being captured by the camera.

2. The method of claim 1, further comprising:
  determining, by the augmented reality presentation system, a start time at which the augmented reality content is to begin being displayed within the pixel region of the display screen; and
  abstaining, by the augmented reality presentation system, from directing the mobile device to display the augmented reality content within the pixel region of the display screen until the start time.

3. The method of claim 2, wherein the determining of the start time comprises at least one of detecting a trigger representative of the start time within the video feed, detecting an audio trigger representative of the start time within an audio stream associated with the video feed, and receiving data representative of the start time from a source other than the video feed or the audio stream.

4. The method of claim 1, wherein the identifying of the media content instance comprises:
  detecting an attribute associated with the media content instance; and
  identifying the media content instance based on the attribute.

5. The method of claim 1, wherein the media content instance is a live event being displayed in substantially real time as the live event occurs, and wherein the identifying of the media content instance comprises:
  accessing data representative of an audio signature generated by one or more microphones physically disposed at the live event, the audio signature representative of sound generated at the live event;
  comparing an audio clip detected by the mobile device with the audio signature while the display device displays the media content instance; and
  identifying the media content instance based on the comparison between the audio detected by the mobile device and the audio signature.

6. The method of claim 1, wherein the identifying of the media content instance comprises:
  directing the mobile device to detect an audio clip associated with the video feed;
  accessing a database of audio signatures maintained by a server remote from the mobile device and each corresponding to a distinct media content instance included in a plurality of media content instances;
  determining that the audio clip matches a particular audio signature included in the database of audio signatures; and
  determining, by the augmented reality presentation system based on the match, that the display device is displaying a particular media content instance included in the plurality of media content instances and that corresponds to the particular audio signature.

7. The method of claim 1, wherein the identifying of the media content instance comprises:
  directing the mobile device to establish a communication channel between a computing device that controls the display device and the mobile device; and
  directing the mobile device to query the computing device by way of the communication channel for data representative of an identity of the media content instance.

8. The method of claim 1, further comprising:
  identifying, by the augmented reality presentation system, a trait of a user of the mobile device; and
  determining, by the augmented reality presentation system based on the identified trait, that the user is permitted to view the augmented reality content;
  wherein the directing of the mobile device to display the augmented reality content is performed in response to the determining that the user is permitted to view the augmented reality content.

9. The method of claim 1, further comprising:
  detecting, by the augmented reality presentation system, a movement of the mobile device while the mobile device is displaying the augmented reality content within the pixel region of the display screen;
  identifying, by the augmented reality presentation system in response to the detecting of the movement of the mobile device, a new pixel region within the display screen that corresponds to the position of the display device within the field of view of the camera; and
  directing, by the augmented reality presentation system, the mobile device to display the augmented reality content within the new pixel region instead of within the pixel region while mobile device displays, within the display screen, the video feed being captured by the camera.

10. The method of claim 1, further comprising decreasing, by the augmented reality presentation system in response to the directing of the mobile device to display the augmented reality content within the pixel region of the display screen, a volume level output by the display device.

11. The method of claim 1, further comprising:
  detecting, by the augmented reality presentation system while the mobile device is displaying the augmented reality content within the pixel region of the display screen, a user input command representative of a request to resize a display of the augmented reality content within the display screen; and
  directing, by the augmented reality presentation system in response to the user input command, the mobile device to display the augmented reality content within a portion of the display screen that is different than the pixel region.

12. The method of claim 1, further comprising:
  detecting, by the augmented reality presentation system while the mobile device is displaying the augmented reality content within the pixel region of the display screen, a user input command representative of a request to display the augmented reality content on the display device; and
  directing, by the augmented reality presentation system in response to the user input command, the display device to begin displaying the augmented reality content.

13. A system comprising:
at least one physical computing device that:
  directs a camera included within a mobile device to capture a video feed of a portion of a real-world environment, the portion of the real-world environment included within a field of view of the camera;
  directs the mobile device to display the video feed within a display screen of the mobile device while the camera captures the video feed;
  determines a plurality of successive peak signal-to-noise ratios (PSNRs) for a plurality of pixel blocks within the display screen of the mobile device;
  determines, based on the successive PSNRs for the plurality of pixel blocks, maximum PSNR values and minimum PSNR values for each of the plurality of pixel blocks;
  identifies, based on the maximum PSNR values and the minimum PSNR values, a plurality of adjacent pixel blocks within the display screen of the mobile device that have PSNR values that vary by more than a threshold amount over a predetermined time period, the plurality of adjacent pixel blocks together constituting a pixel region within the display screen;

determines, based on the uniformly varying PSNR values, that the pixel region of the display screen of the mobile device corresponds to a position of a display device within the field of view of the camera, the display device physically located within the portion of the real-world environment;

identifies a media content instance being displayed by the display device while the display device is included within the field of view of the camera;

identifies augmented reality content associated with the media content instance; and directs the mobile device to display the augmented reality content within the pixel region of the display screen while mobile device displays, within the display screen, the video feed being captured by the camera.

14. The system of claim 13, wherein the media content instance is a live event being displayed in substantially real time as the live event occurs, and wherein the at least one physical computing device identifies the media content instance by:

accessing data representative of an audio signature generated by one or more microphones physically disposed at the live event, the audio signature representative of sound generated at the live event;

comparing an audio clip detected by the mobile device with the audio signature while the display device displays the media content instance; and identifying the media content instance based on the comparison between the audio detected by the mobile device and the audio signature.

15. The system of claim 13, wherein the at least one physical computing device further:

determines a start time at which the augmented reality content is to begin being displayed within the pixel region of the display screen; and abstains from directing the mobile device to display the augmented reality content within the pixel region of the display screen until the start time.

16. The system of claim 15, wherein the determining of the start time comprises at least one of detecting a trigger representative of the start time within the video feed, detecting an audio trigger representative of the start time within an audio stream associated with the video feed, and receiving data representative of the start time from a source other than the video feed or the audio stream.

17. The system of claim 13, wherein the identifying of the media content instance comprises:

detecting an attribute associated with the media content instance; and identifying the media content instance based on the attribute.

18. The system of claim 13, wherein the identifying of the media content instance comprises:

directing the mobile device to detect an audio clip associated with the video feed;

accessing a database of audio signatures maintained by a server remote from the mobile device and each corresponding to a distinct media content instance included in a plurality of media content instances;

determining that the audio clip matches a particular audio signature included in the database of audio signatures; and determining, by the augmented reality presentation system based on the match, that the display device is displaying a particular media content instance included in the plurality of media content instances and that corresponds to the particular audio signature.

19. The system of claim 13, wherein the identifying of the media content instance comprises:

directing the mobile device to establish a communication channel between a computing device that controls the display device and the mobile device; and directing the mobile device to query the computing device by way of the communication channel for data representative of an identity of the media content instance.

20. The system of claim 13, wherein the at least one physical computing device further:

identifies a trait of a user of the mobile device; and determines, based on the identified trait, that the user is permitted to view the augmented reality content;

wherein the directing of the mobile device to display the augmented reality content is performed in response to the determining that the user is permitted to view the augmented reality content.

* * * * *